US006427849B2

(12) United States Patent
Swan

(10) Patent No.: US 6,427,849 B2
(45) Date of Patent: Aug. 6, 2002

(54) ILLUMINATED MAGNIFIED CD RACK

(76) Inventor: Michael P. Swan, 650 84th St., #37, Miami Beach, FL (US) 33141

(*) Notice: Subject to any disclaimer, the term of this patent is extended or adjusted under 35 U.S.C. 154(b) by 0 days.

(21) Appl. No.: 09/893,783

(22) Filed: Jun. 29, 2001

Related U.S. Application Data

(60) Provisional application No. 60/221,185, filed on Jul. 27, 2000.

(51) Int. Cl.[7] .................................................. A47F 5/00
(52) U.S. Cl. ........................ 211/40; 312/9.9; 359/802
(58) Field of Search ............................. 211/40, 41.12, 211/42, 43; 312/9.1, 9.9; 359/802

(56) References Cited

U.S. PATENT DOCUMENTS

| 2,533,628 | A | * | 12/1950 | Rosenberg |
| 4,496,127 | A | * | 1/1985 | Nelson |
| 4,650,072 | A | | 3/1987 | Ackeret |
| 4,939,625 | A | * | 7/1990 | Olson |
| 4,993,558 | A | * | 2/1991 | Assael ........................ 211/40 |
| D323,931 | S | | 2/1992 | Haynes |
| 5,333,907 | A | * | 8/1994 | Schaeffer ................ 359/802 X |
| 5,341,943 | A | | 8/1994 | Fraser |
| 5,370,242 | A | | 12/1994 | Huang |
| D356,699 | S | | 3/1995 | Lee |
| D357,331 | S | | 4/1995 | Yeh |
| 5,460,275 | A | | 10/1995 | Ladwig |
| D365,244 | S | | 12/1995 | Hawkins |
| 5,584,398 | A | | 12/1996 | Lin |
| 5,607,065 | A | | 3/1997 | Todd |
| 5,690,399 | A | | 11/1997 | Davis |
| 5,713,475 | A | | 2/1998 | Wang |
| 5,975,316 | A | * | 11/1999 | Harris ........................ 211/40 |
| 6,023,377 | A | * | 2/2000 | Slager ........................ 359/802 |

FOREIGN PATENT DOCUMENTS

DE          201 382          7/1983

* cited by examiner

Primary Examiner—Robert W. Gibson, Jr.

(57) ABSTRACT

An illuminated, magnified CD display system which allows a user to quickly and conveniently locate a specific CD in a CD rack of the system. The rack includes a viewing assembly slidably mounted on guide rods. The viewing assembly includes a magnifying lens and at least one electric light to magnify and illuminate the printed matter on the CD cases. The magnifying lens may be pivotally mounted on the viewing assembly.

6 Claims, 3 Drawing Sheets

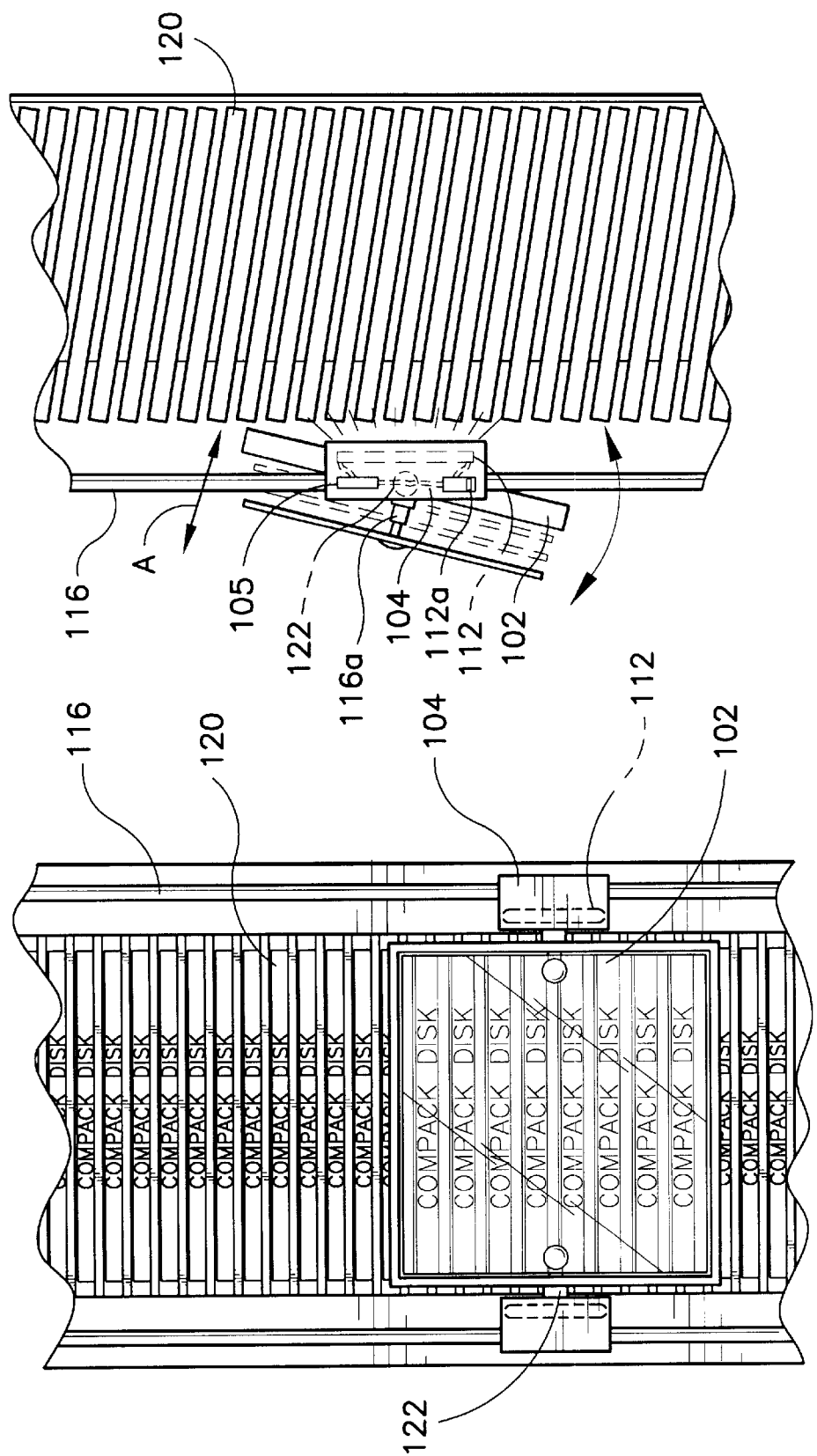

US 6,427,849 B2

ILLUMINATED MAGNIFIED CD RACK

CROSS-REFERENCE TO RELATED APPLICATION

This application claims the benefit of U.S. Provisional Patent Application Serial No. 60/221,185, filed Jul. 27, 2000.

BACKGROUND OF THE INVENTION

1. Field of the Invention

The present invention relates generally to compact disc racks. More specifically, the invention is directed to an illuminated, magnified CD display system having a CD rack with a viewer that illuminates and magnifies the fine print on a CD case.

2. Description of Related Art

Trying to read the small print on CD covers is difficult at best and virtually impossible for people with less than perfect vision. The popularity of CDs, DVDs, CD ROMs, and other optical discs have made CD holders and racks commonplace. However, the print on CD covers or jackets is small and difficult to read even for people with excellent vision. Furthermore, there must be some type of light source nearby; otherwise, a person is forced to strain his or her eyes attempting to read the small print on the poorly illuminated CD cover.

A CD storage rack and lamp assembly is described in U.S. Pat. No. 5,584,398, issued on Dec. 17, 1996 to J. Lin. The CD storage rack and a desk lamp are combined into a single unit. The CD storage rack and lamp assembly include a base, a base covering covered over the base, four sets of connecting rods respectively connected in series by connectors, a lamp stand connected to the base and the base covering by the connecting rods, a plurality of telescopic arms connected between the lamp holder and the lamp stand, and a plurality of CD carrier plates fastened to the connecting rods at different elevations between the lamp stand and the base covering.

U.S. Pat. No. 5,713,475 issued on Feb. 3, 1998 to J. Wang describes a multi-purpose displaying stand. The multi-purpose displaying stand includes a body portion having a rectangular opening, an electrical receptacle, a power switch, an electrical socket, a transparent frame, a neon light, and a rotatable holder. Articles such as a poster or a compact disk can be attractively displayed in the rotatable holder.

Other patents respectively issued and granted to Ackeret (U.S. Pat. No. 4,650,072), Fraser (U.S. Pat. No. 5,341,943), Huang (U.S. Pat. No. 5,370,242), Ladwig (U.S. Pat. No. 5,460,275), Todd (U.S. Pat. No. 5,607,065),Davis (U.S. Pat. No. 5,690,399), Haynes (DES. 323,931), Yeh (DES. 357, 331) and Handdels (DD 201 382) disclose only conventional and/or ornamental features which are considered to be of general relevance to the illuminated CD rack as herein described.

None of the above inventions and patents, taken either singly or in combination, is seen to describe the instant invention as claimed.

SUMMARY OF THE INVENTION

The illuminated, magnified CD according to the present invention provides a magnified CD display system including a CD holder with an illuminating source and a telescoping magnifying viewer for illuminating a plurality of CD cases and for magnifying the small print on the respective CD cases. The viewing assembly has a magnifying portion, an illuminating portion, and a slider assembly. The substantially rectangular shape of the viewer allows for comfortable and convenient viewing of the print on CD cases. The illuminating source is a pair of light bulbs of any desired shape or configuration. The number of light bulbs employed can be varied to allow a wide range of illumination. The illuminated magnifying CD viewing system of the present invention uses a slider assembly to move the viewer over the CD cases in the CD rack. The slider assembly can be configured to allow any desired range and type of viewer motion. The lighting source of the CD display system eliminates the need for an external light source.

Accordingly, it is a principal object of the invention to provide a compact disc holder with an illuminating source and a magnifying viewer that makes it easy and comfortable to read the fine print on a CD cover.

It is another object of the invention to provide a magnified CD display system that employs a track system that allows the magnifying viewer to be moved easily in the desired direction.

It is a further object of the invention to provide a magnifying viewer that can be pivoted to the appropriate viewing angle to accommodate the height and viewing position of the person searching for a specific CD.

Still another object of the invention is to provide a magnified CD display system that allows the user to quickly and comfortably locate a specific CD in a CD holder.

It is an object of the invention to provide improved elements and arrangements thereof in a CD holder with an illuminating means and magnifying viewer for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1B is a sectional view of FIG. 1A, illustrating the illuminated magnifying viewer of the CD rack.

FIG. 2B is a sectional, side perspective view of FIG. 2A, illustrating the sliding and rotatable features of the magnifying viewer of CD rack.

Similar reference characters denote corresponding features consistently throughout the attached drawings.

DETAILED DESCRIPTION OF THE PREFERRED EMBODIMENTS

The present invention, as depicted in FIGS. 1A, 1B, 2A, and 2B, is an illuminated, magnified CD display system, having a CD rack with an illuminating means and magnifying viewer 100.

Figure 1A:
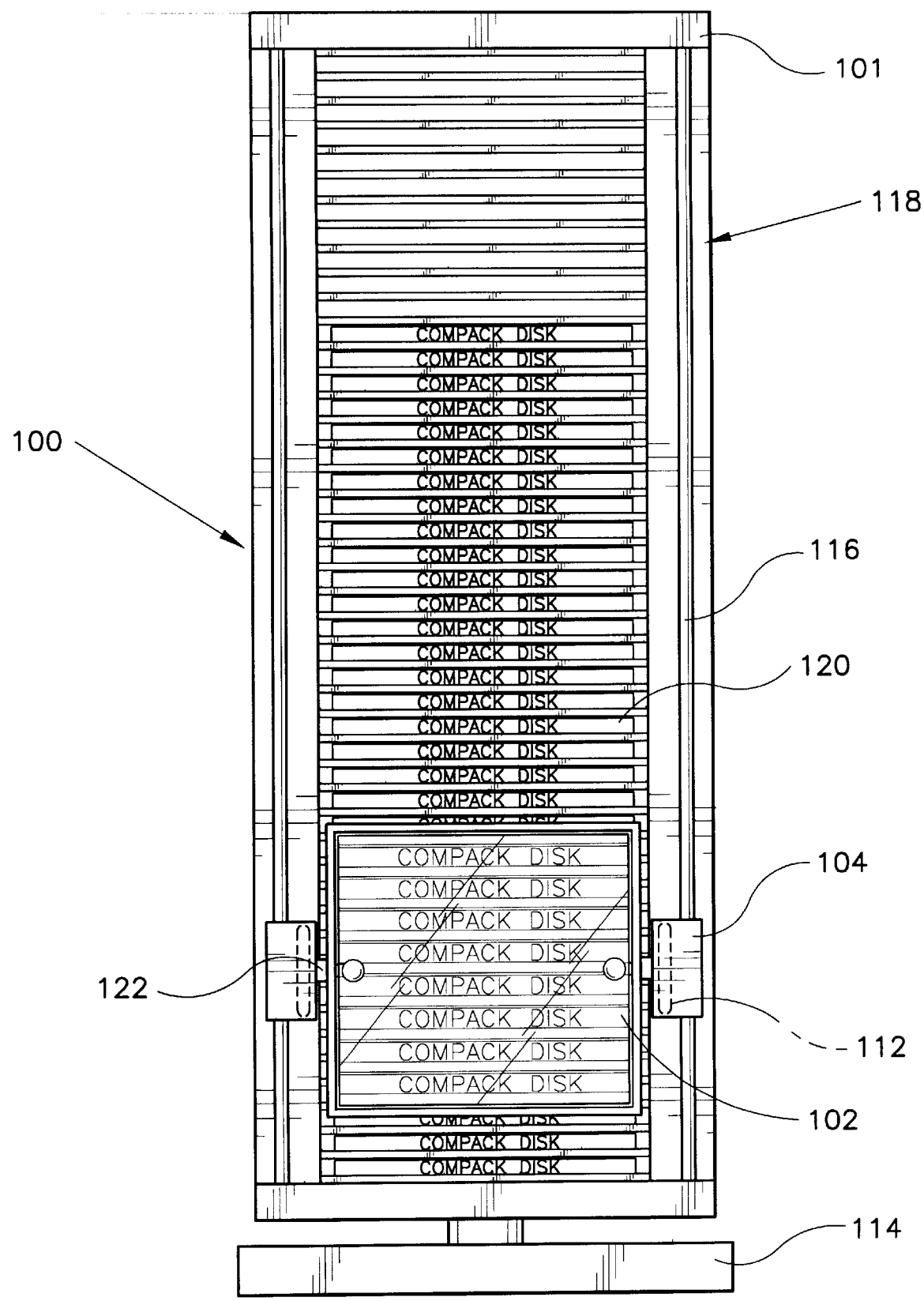
FIG. 1A is a front view of an illuminated magnified CD rack according to the present invention.

FIG. 1A is a front view of the CD holder with an illuminating means and magnifying viewer 100. The illuminating means is a pair of elongated light bulbs 112 housed within a durable plastic casing 104. Each light bulb 112 resides within its own plastic housing 104 as shown in FIG. 1A. A light switch 112a is electrically configured within the housing 104 to provide power 105 as a direct current (DC) to the lights 112. Each plastic housing 104 is slidably disposed on a guiding rod 116 of the track system 118, that is, the guiding rod 116 passes through the plastic housing 104. A pair of connecting pieces 122 of durable plastic connects the light housing 104 to the rectangular shape viewer 102. Preferably, the viewer 102 is pivotally mounted to the plastic light housings 104 by the connecting pieces 122 so that the viewer 102 may be tilted to an appropriate viewing angle. Thus, the plastic housing 104 also functions as a slider casing 104 used to slide the viewer 102 on its track system 118 over the underlying CD covers 120. The viewer 102 readily slides up and down the tracks 116 of the track system 118 allowing the user to easily locate a specific CD 120 he or she is seeking. The magnifying viewer 102 is slidably extended in the direction indicated by the direction arrow A via telescoping or slidable track members 116a.

FIG. 1B is an enlarged or sectional view of the magnifying viewer 102 and illuminating portion 104 of the CD holder 100 showing how the magnifying viewer 102 significantly enlarges the print on a CD cover 120, making the normally small print very readable. The magnifying viewer 102 is a magnifying glass or lens 102 with telescoping or sliding features.

The CD holder 100 depicted in FIG. 1A is a CD tower 101 with a rotating base 114, however, CD holders come in a wide variety of shapes and sizes. The shape and contour of the lighting housing 104 and the shape and contour of the magnifying viewer 102 can be modified to accommodate the shape and contour of the CD holder 100. Additionally, the attachment means used to secure the magnifying viewer 102 to the track system 118 and the attachment means used to secure the track system 118 to the CD holder 100 can be modified to accommodate the geometry and topography of the CD holder 100.

Figure 2A:
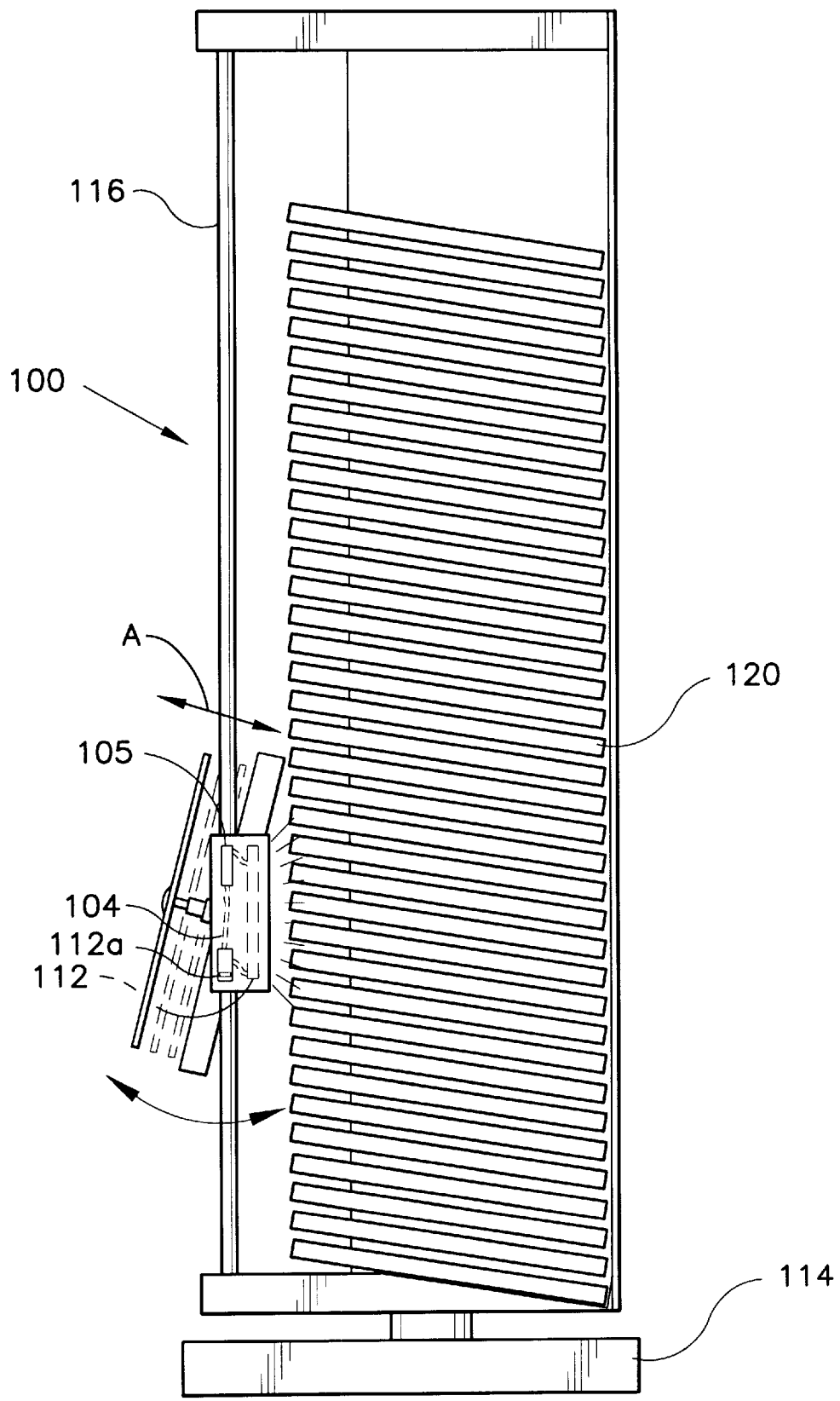
FIG. 2A is a side view of the illuminated magnified CD rack, illustrating an exposed section for access to a plurality of CDs stored therein.

FIG. 2A is a side view of the illuminated CD holder with magnifying viewer 100 showing how the viewer 102 pivots to accommodate the height of the user or the position of the user looking for a specific CD 120. The rotating base 114 further assists the user in finding his or her specific CD 120 by making it easy for the user to rotate the CD holder 100 to a position that is comfortable and convenient for the user.

FIG. 2B is an enlarged or sectional side view of the illuminated CD holder magnifying viewer 100 showing how the light bulbs 112 adjacent the magnifying viewer 102 illuminate the CD covers 120 in the CD holder 100 providing the user with the light needed to easily read the small print on a CD cover 120 in a dimly lit room. In fact, the illuminating means 104 makes it possible to quickly find a CD 120 in a room with no other source of light. The CDs 120 can be in angle slots (hidden) or straight slots (hidden).

The illuminated magnifying CD display system 100 shown in the figures has a viewer 102 that moves with a linear vertical motion because of the specific arrangement or configuration of the CD holder 100. The viewer 102 can be made to move in any desired direction with any desired motion that produces or results in the proper viewing perspective of the print on a CD cover 120 in accordance with the specific arrangement or configuration of the CD holder 100. For example, the viewer 102 can be made to move from side to side with a circular motion around a circular shaped CD holder or rack 100. Furthermore, the track system 118 can be modified to produce any type of viewer 102 motion. A combination of track systems 118 can be combined to produce a desired viewer 102 motion, for example, a linear vertical track that crosses a horizontal circular track allows the viewer 102 to move not only up and down and from side to side.

The illuminated magnifying CD display system of the present invention can be used to readily locate CDs in any type of setting, for example, record stores can use the illuminated magnifying CD display system to quickly locate CDs for customers and when doing inventory. The viewer, the accompanying lighting, and the track system can be scaled up or down in size to accommodate the size of the structure housing the CDs. The illuminated magnifying CD display system can be used to quickly locate CDs, laser discs, or any merchandise that has a similar packaging. In a multiple CD rack arrangement, a first and second CD rack can be interconnected via a releasable or insertable fastener, such that the exposed sides of each rack system will be open for quick and simple removal of a specific CD.

The preferred embodiments of the present invention disclosed herein are intended to be illustrative only and are not intended to the limit the scope of the invention. It should be understood by those skilled in the art that various modifications and adaptations of the present invention as well as alternative embodiments of the present invention may be contemplated.

It is to be understood that the present invention is not limited to the sole embodiments described above, but encompasses any and all embodiments within the scope of the following claims.

I claim:

1. An illuminated, magnified compact CD display system, comprising:

a compact disk rack for holding a plurality of compact disk cases;

at least one guide rod mounted on said rack;

a viewing assembly slidably mounted on said at least one guide rod, said viewing assembly including a magnifying lens for magnifying printed material on the plurality of compact disk cases; the assembly having a telescoping viewing element; and an illumination means for illuminating printed material on the plurality of compact disk cases;

wherein said viewing assembly is slidable on said at least one guide rod to position said viewing assembly relative to a plurality of compact disk cases in order to magnify printed material on at least one of the plurality of compact disk cases.

2. The illuminated, magnified compact CD display system according to claim 1, wherein said illumination means comprises at least one electric light.

3. The illuminated, magnified compact CD display system according to claim 1, wherein the magnifying lens is pivotally mounted on said viewing assembly.

4. An illuminated, magnified compact CD display system, comprising, in combination with a plurality of compact disc cases for respectively retaining a plurality of compact discs:

a compact disk rack for holding said plurality of compact disk cases;

at least one guide rod mounted on said rack;

a viewing assembly slidably mounted on said at least one guide rod, said viewing assembly including a magnifying lens for magnifying printed material on the plurality of compact disk cases; and illumination means for illuminating printed material on the plurality of compact disk cases;

wherein said viewing assembly is slidable on said at least one guide rod to position said viewing assembly relative to a plurality of compact disk cases in order to magnify printed material on at least one of the plurality of compact disk cases.

5. The illuminated, magnified compact CD display system according to claim 4, wherein said illumination means comprises at least one electric light.

6. The illuminated, magnified compact CD display system according to claim 4, wherein the magnifying lens is pivotally mounted on said viewing assembly.

* * * * *